United States Patent
Clovis et al.

(10) Patent No.: US 9,733,957 B2
(45) Date of Patent: Aug. 15, 2017

(54) FREQUENCY AND POWER MANAGEMENT

(71) Applicant: QUALCOMM Incorporated, San Diego, CA (US)

(72) Inventors: Philip Michael Clovis, San Diego, CA (US); Reza Mohammadpourrad, San Diego, CA (US); Zeeshan Shafaq Syed, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 14/479,123

(22) Filed: Sep. 5, 2014

(65) Prior Publication Data

US 2016/0070582 A1   Mar. 10, 2016

(51) Int. Cl.
| | |
|---|---|
| G06F 13/20 | (2006.01) |
| G06F 9/445 | (2006.01) |
| G06F 1/32 | (2006.01) |
| G06F 13/42 | (2006.01) |
| G06F 13/38 | (2006.01) |

(52) U.S. Cl.
CPC ........ G06F 9/44505 (2013.01); G06F 1/3296 (2013.01); G06F 13/385 (2013.01); G06F 13/4208 (2013.01); Y02B 60/1228 (2013.01); Y02B 60/1235 (2013.01)

(58) Field of Classification Search
USPC .......... 710/305–315, 104–110; 713/300–340
See application file for complete search history.

(56) References Cited

U.S. PATENT DOCUMENTS

| | | | |
|---|---|---|---|
| 8,068,150 B2 | 11/2011 | Koganezawa et al. | |
| 8,693,395 B2 * | 4/2014 | Hwang | H04L 1/188 370/328 |
| 9,477,289 B2 * | 10/2016 | Jain | G06F 1/3225 |
| 2003/0046396 A1 | 3/2003 | Richter et al. | |
| 2010/0138684 A1 | 6/2010 | Kim et al. | |
| 2012/0054503 A1 | 3/2012 | Hsiao et al. | |
| 2012/0117402 A1 | 5/2012 | Machnicki et al. | |
| 2012/0173836 A1 | 7/2012 | Yermalayeu | |

OTHER PUBLICATIONS

International Search Report and Written Opinion—PCT/US2015/040888—ISA/EPO—Nov. 27, 2015.
Second Written Opinion from International Application No. PCT/US2015/040888, mailed Aug. 23, 2016, 5 pages.

* cited by examiner

Primary Examiner — Raymond Phan
(74) Attorney, Agent, or Firm — Procopio, Cory, Hargreaves & S

(57) ABSTRACT

Changing operating states of a PHY interface which includes a plurality of blocks, changing operating states of a PHY interface includes: receiving parameters indicating desired feature settings of the plurality of blocks for changing the operating state of the PHY interface; and enabling the desired feature settings in a sequence, the sequence based on dependencies between the feature settings, the dependencies being stored in a dependency table.

27 Claims, 11 Drawing Sheets

FIG. 3A

FREQUENCY AND POWER MANAGEMENT

BACKGROUND

Field

This invention relates to memory control sequencers, and more specifically, to memory control sequencing for frequency and power changes.

Background

Frequency and power management in a double data rate (DDR) physical (PHY) interface module is becoming increasingly complicated because the DDR-PHY has a high pin count that can result in high dynamic power. The DDR-PHY also has high frequency requirements and must transmit and receive data across a wide frequency range to support low-power DDR (LPDDR) specs. High frequency data communication is facilitated by additional high performance circuitry, on-die termination, variable voltage output high (VOH), etc. However, many of the features required to transmit and receive data at high frequency are not needed at lower frequency. Therefore, feature scaling is critical to maintaining a competitive power usage profile across frequencies. In other words, some features used to enable high frequency data communication are not necessary for low frequency data communication. In previous generations of a DDR PHY interface, different types of ad-hoc logic blocks were used to control switching between frequencies and power modes. However, adding ad-hoc control logic for frequency and power control of blocks becomes very difficult to handle due to increased complexity of the PHY interface module. The number of PHY features, and interdependencies between them, has grown to the extent that an easily expandable architecture is highly desirable to control these features.

SUMMARY

The present invention provides for changing an operating state of a PHY interface which includes a plurality of blocks.

In one embodiment, a method is disclosed. The method includes: changing operating states of a PHY interface which includes a plurality of blocks, changing operating states of a PHY interface includes: receiving parameters indicating desired feature settings of the plurality of blocks for changing the operating state of the PHY interface; and enabling the desired feature settings in a sequence, the sequence based on dependencies between the feature settings, the dependencies being stored in a dependency table.

In another embodiment, a state machine apparatus for changing an operating state of a PHY interface is disclosed. The state machine apparatus is configured to: receive parameters indicating feature settings of a plurality of blocks for changing the operating state of the PHY interface; and enable the feature setting in a sequence, the sequence based on dependencies between the feature settings, the dependencies being stored in a dependency table.

In another embodiment, an apparatus for changing an operating state of a PHY interface is disclosed. The apparatus includes: means for receiving parameters indicating desired feature settings of a plurality of blocks for changing the operating state of the PHY interface; and means for enabling the desired feature settings in a sequence, the sequence based on dependencies between the feature settings, the dependencies being stored in a dependency table.

In yet another embodiment, a frequency and power managing system is disclosed. The system includes: a plurality of software-programmable tables having a representation of features and properties of a plurality of blocks including frequency threshold, wakeup time requirements, interdependencies, and power requirements; and a sequencing unit configured to switch feature settings of the plurality of blocks to an operating state of a plurality of operating states of a PHY interface, including performance states and power states, based on a request from a memory controller.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which:

FIG. 3A is a sample list of features of blocks that need to be controlled for a change in the operating state including corresponding properties such as wakeup times, dependencies, and stall times in accordance with one embodiment of the present invention;

DETAILED DESCRIPTION

As stated above, a DDR-PHY interface module is becoming increasingly complicated because the DDR-PHY interface module has a high pin count that can result in high dynamic power and must work across a wide frequency range. For example, the PHY interface needs to work in several different communication modes to save power wherein the data rate is different in each communication mode. To do this, a system-on-chip (SoC) which includes the PHY interface assesses the amount of data to be transferred to or from the memory and chooses the communication mode with the lowest data rate or lowest power consumption that can accomplish the task on time. For example, if there is a lot of time sensitive data that needs to be transmitted to the memory, the SoC chooses a high data rate and/or high power communication mode. Otherwise, if there is a small amount of data that needs to be transmitted to the memory, the SoC chooses a low data rate and/or low power communication mode to conserve power. In previous generations of a DDR PHY interface, different types of ad-hoc logic blocks were used to control switching between modes of the frequency and/or power. However, adding ad-hoc control logic for frequency and/or power control of blocks becomes very difficult to handle due to increased complexity of the PHY interface module. The number of PHY features, and inter-dependencies between them, has grown to the extent that an easily expandable architecture is highly desirable to control these features. The term "frequency" is used to refer to the data rate.

Several embodiments as described herein provide for dynamically controlling features of an interface module, wherein properties of the features of a plurality of blocks in the interface module are defined and controlled in a table-based structure. In one embodiment, the features include frequency threshold, wakeup time requirements, interdependencies, power requirements, and other related features. Further, in one embodiment, the blocks are mixed-signal blocks. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Figure 1:
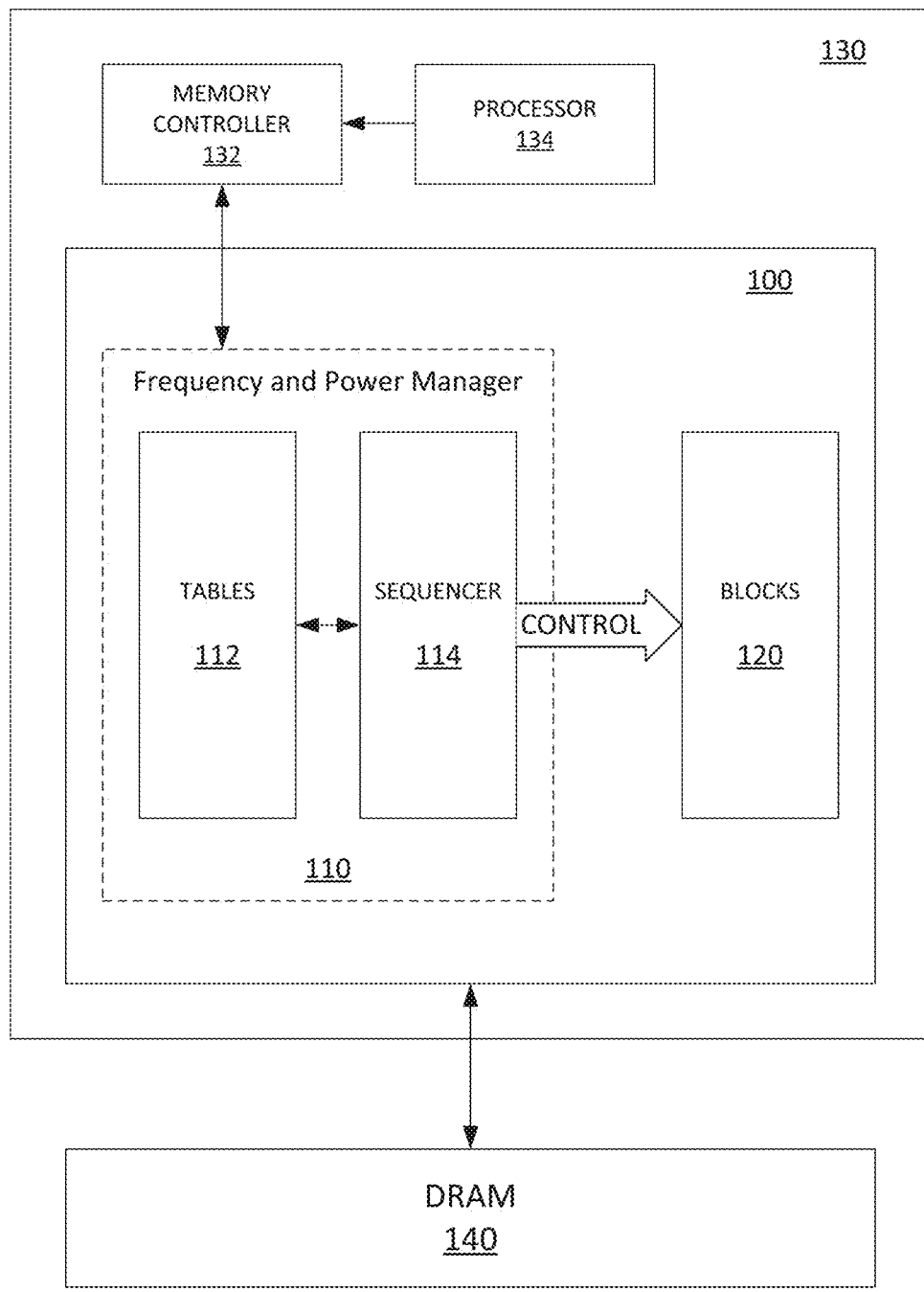
FIG. 1 is a functional block diagram of a PHY interface residing within a system-on-chip (SoC) in accordance with one embodiment of the present invention.

FIG. 1 is a functional block diagram of a PHY interface 100 residing within a system-on-chip (SoC) 130 in accordance with one embodiment of the present invention. In one embodiment, the PHY interface 100 is a DDR-PHY interface which communicates with DDR dynamic random-access memory (DRAM) 140. The SoC 130 may also include processor(s) 134 and a memory controller 132.

In the illustrated embodiment of FIG. 1, the PHY interface 100 includes a frequency and power manager 110 and a plurality of blocks 120. In one embodiment, the blocks include, but are not limited to, input receivers, multiplexers, a reference voltage generator, a bias current generator, a phase lock loop (PLL), a current-to-voltage converter, a calibrated delay circuit (CDC), a low-dropout (LDO) regulator, and other similarly-configured blocks. In one embodiment, the frequency and power manager 110 is implemented in hardware.

The illustrated embodiment of FIG. 1 also shows the frequency and power manager 110 including tables 112 and a sequencer 114. In one embodiment, the tables 112 are control/status register (CSR) tables which define features, performance states, and power states. The tables 112 may be software programmable and may include representations of features and their properties, such as frequency threshold, wakeup time requirements, interdependencies, power requirements, and other related features, for the plurality of blocks 120. The tables 112 may be programmed at boot time, and the values may be re-calculated thereafter. The sequencer 114 may include sequencing logic for switching DDR-PHY settings to a new operating state including a new performance state, a new power state, or both based on a request from the memory controller 132 for changes to frequency and/or power. In particular, sequencer 114 applies new settings to the blocks 120 to change the operation of the blocks 120 based on the request from the memory controller 132. For example, current feature settings of the blocks 120 may cause the blocks 120 to operate in a high performance state and high power state. Frequency and power manager 110 may receive a request from memory controller 132 to operate in a lower performance state and low power state. Consequently, sequencer 114 may provide different properties (parameters) to the features of blocks 120 that cause blocks 120 to operate in the low performance and low power state. Frequency and power manager 110 may determine the properties applied to the features from tables 112. The sequencing logic steps through a process of enabling features used in the new performance state or power state and disabling features not used in the new performance state or power state, while considering the timing and dependencies between the features. In one embodiment, the implementations of the tables 112 and the sequencer 114 run in the background so that frequency and power switching will not affect the blocks and the data being transmitted and received to/from DRAM 140 in the foreground until after the traffic is stalled and the switched operating states take effect. In one embodiment, an apparatus (e.g., a sequencer in this case) may enable a block (e.g., one of the blocks 120) by turning on or waking up the block, and may disable the block by turning off the block. In another embodiment, an apparatus may enable the block by changing a state of the block from a lower-power standby state to a higher-power operational state, and may disable the block by changing a state of the block from a higher-power operational state to a lower-power standby state. The sequencer 114 also minimizes the traffic stall time by handling non-stall features in a separate phase. In other words, the sequencer 114 can change the state of some blocks that are not currently involved in communicating with DRAM 140 ahead of time since changing the state of these blocks does not affect traffic communicated to/from DRAM 140. Thus, the sequencer generates control signals for a large number of features for the blocks 120. Accordingly, the control signals have different settings depending on the operating state of the device.

Figure 2:
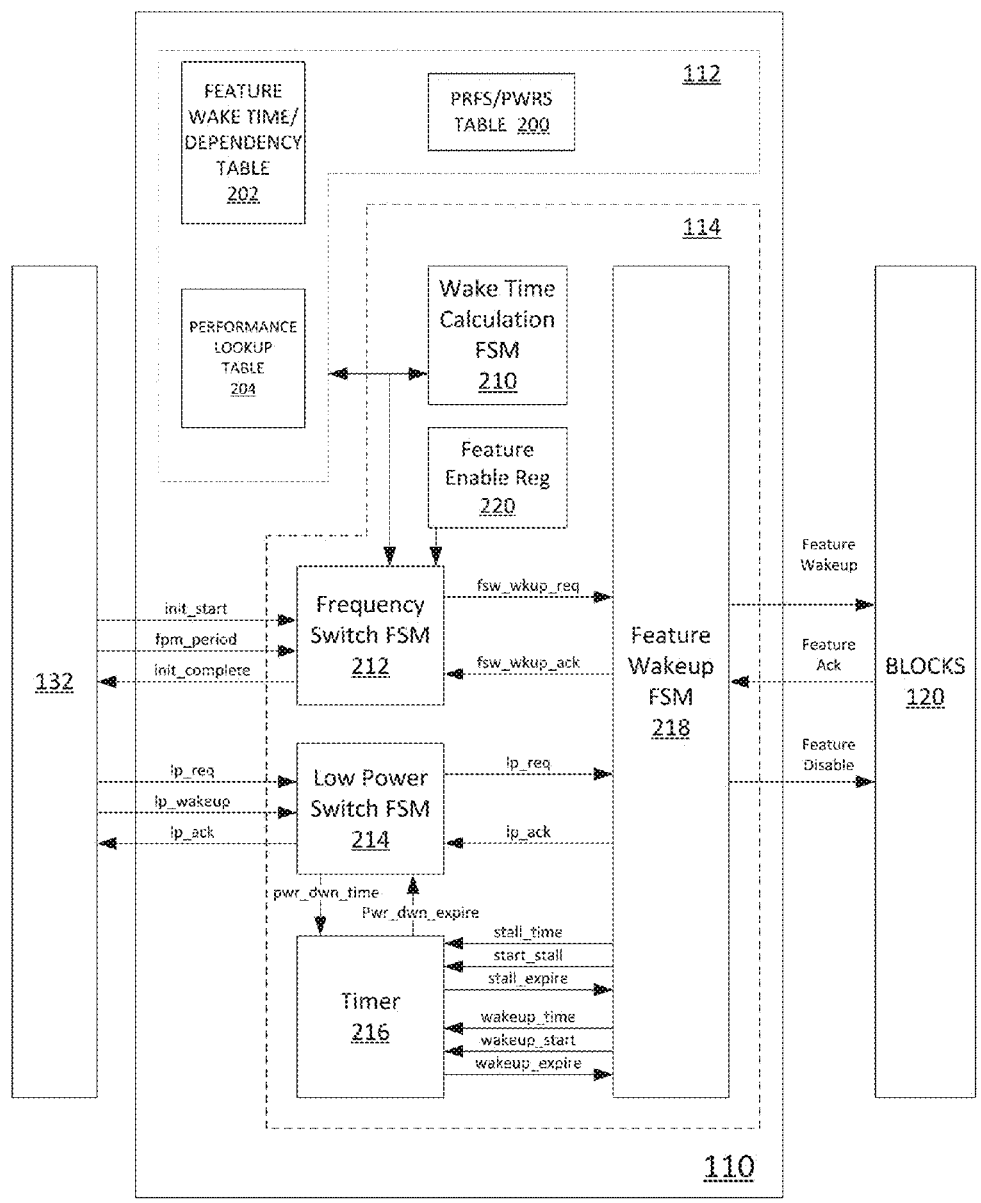
FIG. 2 is a detailed functional block diagram of the frequency and power manager in accordance with one embodiment of the present invention.

FIG. 2 is a detailed functional block diagram of the frequency and power manager 110 in accordance with one embodiment of the present invention. As described above with respect to FIG. 1, the frequency and power manager 110 includes tables 112 and a sequencer 114. In the illustrated embodiment of FIG. 2, the tables 112 include: a Performance State (PRFS)/Power State (PWRS) table 200, a feature wake time/dependency table 202, and a performance lookup table 204; and sequencer 114 includes a wake time calculation finite state machine (FSM) 210, a frequency switch FSM 212, a low power switch FSM 214, a timer 216, and a feature wakeup FSM 218. Although the illustrated embodiments and claims use the term table or lookup table, any type of data structure that defines the sequencing for the operating state can be used in place of the table or lookup table. In some embodiments, any set of information related to the sequencing for operating state can be stored and used to make a decision. In other embodiments, real-time system variables (e.g., variables that are not stored in any data structure) can be used to provide sequencing for frequency switch or lower power switch.

In the illustrated embodiment of FIG. 2, the finite state machines (FSMs) in the frequency and power manager 110 implement sequential logic circuits (e.g., sequencer 114) and are configured in hardware. An FSM can be in one of a finite number of states. However, the FSM is in only one current state at a time. It can change from one state to another when initiated by a triggering event or condition called a transition. A particular FSM is defined by a list of its states, and the triggering condition for each transition. When changing the features or parameters of the blocks 120, the signals sent from the feature wakeup FSM 218 to the blocks 120 may be very time sensitive. In some cases, digital values may be sent from the feature wakeup FSM 218 to the blocks 120, but in other cases, analog or digital signals (such as enable/wakeup signals sent on enable lines) may be sent from the feature wakeup FSM 218 to the blocks 120. These signals may be very time sensitive. Accordingly, the frequency and power manager 110 is implemented in hardware as a state machine and is physically located adjacent to the blocks 120. In contrast, if the signals were generated by a software-implemented frequency and power manager, the signals might not be presented at the right times relative to each other or would require longer wait times compared to a finite state machine implementation that would make changes in the performance state or power state very slow and inefficient.

Regarding the tables 112, the PRFS/PWRS table 200 defines the enable/disable status of features of blocks 120 for each performance state and power state. A performance state defines a frequency (e.g., a data rate used to transmit data from SoC 130 to DRAM 140 or a data rate at which SoC 130 received data from DRAM 140 or both) state to which the PHY interface can switch, while a power state defines a state to which the PHY interface can switch based on a low power request. Pre-defined (e.g., at boot time) values of the features of blocks 120 for each performance and power state are identified through a characterization process of the features of blocks and are not modified during product operation. The feature wake time/dependency table 202 keeps the wakeup time and dependency between features. The wakeup time is the time required by a block to be ready for operation. For example, certain features require some time to stabilize or adjust, which is referred to as a wakeup time. A dependency is when some features depend on other features. For example, a delay-locked loop (DLL) may need to be turned on after a particular current source is turned on rather than prior to turning on the current source or simultaneously turning on the current source and the DLL. These values may also be determined during product characterization and are typically not changed during normal chip operation. The performance lookup table 204 defines the mapping between performance states and frequency ranges. The frequency ranges are a set of different frequencies or rates at which data is communicated between the SoC and the memory (e.g., a DRAM) or between the memory and the SoC. For example, in a high performance state, there are high rates and in a low performance state there are low rates. This table keeps the clock periods corresponding to each of the defined performance states.

Regarding the sequencer 114, the wake time calculation FSM 210 is responsible for calculating the wakeup times of each of the power states, i.e. the amount of time it takes to switch the PHY interface (including blocks 120) from one power state to another power state. In one embodiment, a wakeup time is a time it takes to switch the PHY interface from a non-functional power state to a fully-functional state. This calculation needs to be performed for each power state of each performance state at boot time. Results of this calculation are kept in a register lookup table (i.e., power state wakeup time table) and are referred to during low power request transitions.

The frequency switch (FSW) FSM 212 supports the DDR-PHY interface handshake and is based on received request from the memory controller 132. The FSW FSM 212 also selects a new performance state. The FSW FSM 212 further initiates requests to the feature wakeup FSM 218 so that the required features for the new performance state are enabled. The frequency switch interface signals are transmitted and received between the FSW FSM 212 and the memory controller 132. These signals include at least init_start, init_complete, and fpm_period, which are described below in detail.

The low power (LP) switch FSM 214 interfaces with the LP interface signals. Upon receipt of power state change requests from the memory controller 132, the LP switch FSM 214 looks up the time required for waking up from each power state within the current performance state. If a wakeup time requested by memory controller 132 is longer than the wakeup time of one of the power states, LP switch FSM 214 initiates a request to the feature wakeup FSM 218 to transition from the current power state to a selected low power state. The LP switch FSM 214 also sets (e.g., using signal pwr_dwn_time) the timer 216 so that once the timer expires (e.g., using signal pwr_dwn_expire), the wakeup process initiates in time to bring the PHY back to a fully functional state prior to the wakeup time requested by memory controller 132. The LP interface signals are defined as a request/acknowledge (i.e., req/ack) pair of signals that are transmitted and received between the LP FSMs 214 and the memory controller 132. These signals include at least lp_req, lp_ack, and lp_wakeup, which are described below in detail.

The feature wakeup FSM 218 receives requests from the FSW FSM 212 and LP switch FSM 214 to turn on/off features of blocks 120 according to the feature enable register (FER) 220. The feature wakeup FSM 218 performs a turn-on sequence based on the dependencies between different features and enables features that are not dependent in parallel and then enables a next set of features. The feature wakeup FSM 218 considers the wakeup time requirements of features and properly sets the timer 216 based on these requirements. The feature wakeup FSM 218 also considers the stall requirements of the features that require traffic stall to be turned on. The feature wakeup FSM 218 then generates another set of enable signals that are based on stall time requirements of those features. These enable signals are triggered once the init_start signal coming from the memory controller 132 goes low indicating a traffic stall period. After enabling features, the feature wakeup FSM 218 will send the init_complete signal to the memory controller 132 indicating the end of the frequency switch or low power transition.

As described above, the lower power interface is defined as a request/acknowledge (i.e., req/ack) pair of signals. Thus, signals being transmitted and received between the FSMs 212, 214 and the memory controller 132 include at least init_start, init_complete, fpm_period, lp_req, lp_wakeup, and lp_ack. Signal init_start refers to the PHY initialization start. When this signal is asserted, the memory controller is requesting a DDR clock frequency change or a frequency ratio change. Signals freq_ratio, legacy_mode, fpm_period need to be setup prior to the assertion of init_start. Signal init_complete refers to the PHY initialization complete. The init_complete signal indicates that the PHY is able to respond to any proper stimulus on the PHY interface. All PHY interface signals that communicate commands or status are held at their default values until the init_complete signal is asserted. During a PHY re-initialization request (e.g., a frequency change), this signal will be de-asserted. For a frequency change request, the de-assertion of the init_complete signal acknowledges the frequency change protocol. Signal fpm_period indicates the next target frequency and is provided by memory controller 132. Signal lp_req is a low power opportunity request. This signal is used by the memory controller 132 to inform the PHY of an opportunity to switch to a low power mode. Signal lp_wakeup, provided by memory controller 132 refers to a low power wakeup time. This signal indicates which one of the 16 wakeup times the memory controller 132 is requesting for the PHY. Signal lp_ack refers to a low power acknowledgement. This signal is asserted to acknowledge the memory controller low power opportunity request. The PHY is not required to acknowledge this request.

Figure 3A:
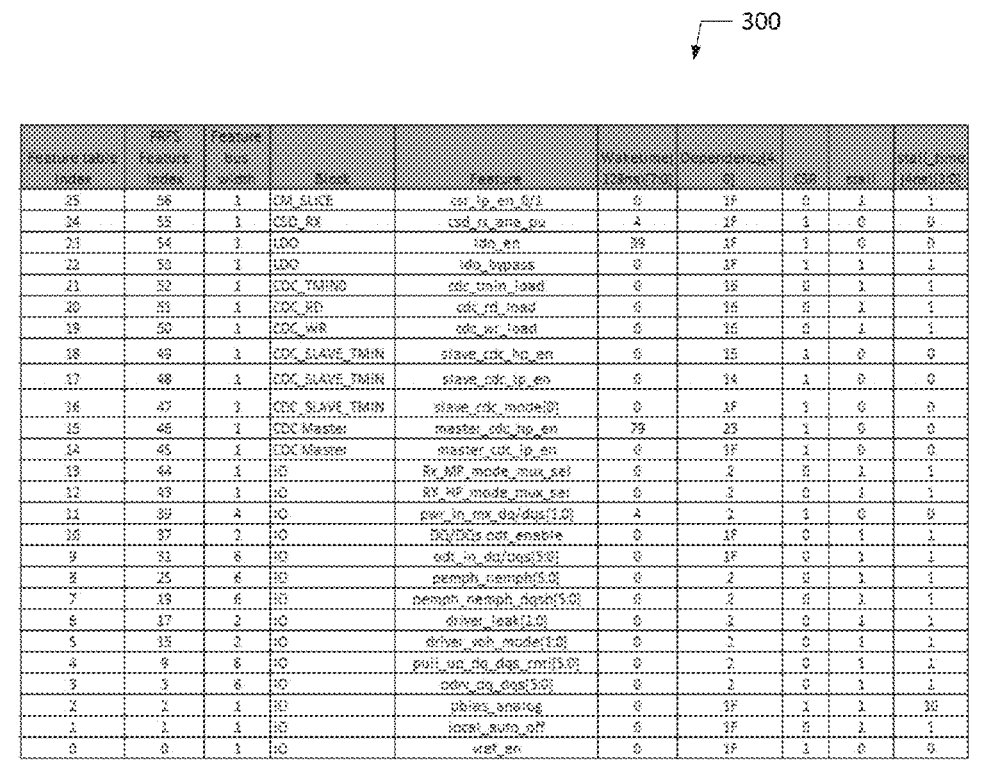

FIG. 3A is a sample list 300 of features of blocks 120 that may be controlled for a change in the operating state including corresponding properties such as wakeup times, dependencies, and stall times in accordance with one embodiment of the present invention. In one embodiment, these features and the corresponding properties are programmed in a set of tables 112. As described above, in one embodiment, the tables are CSR tables. The pre-defined values of the features for each performance and power state are identified through a characterization process of features of blocks and are not modified during product operation. The feature wake time/dependency keeps the wakeup time and dependency between features. These values should also be determined during product characterization and are not typically changed during normal chip operation.

Figure 3B:
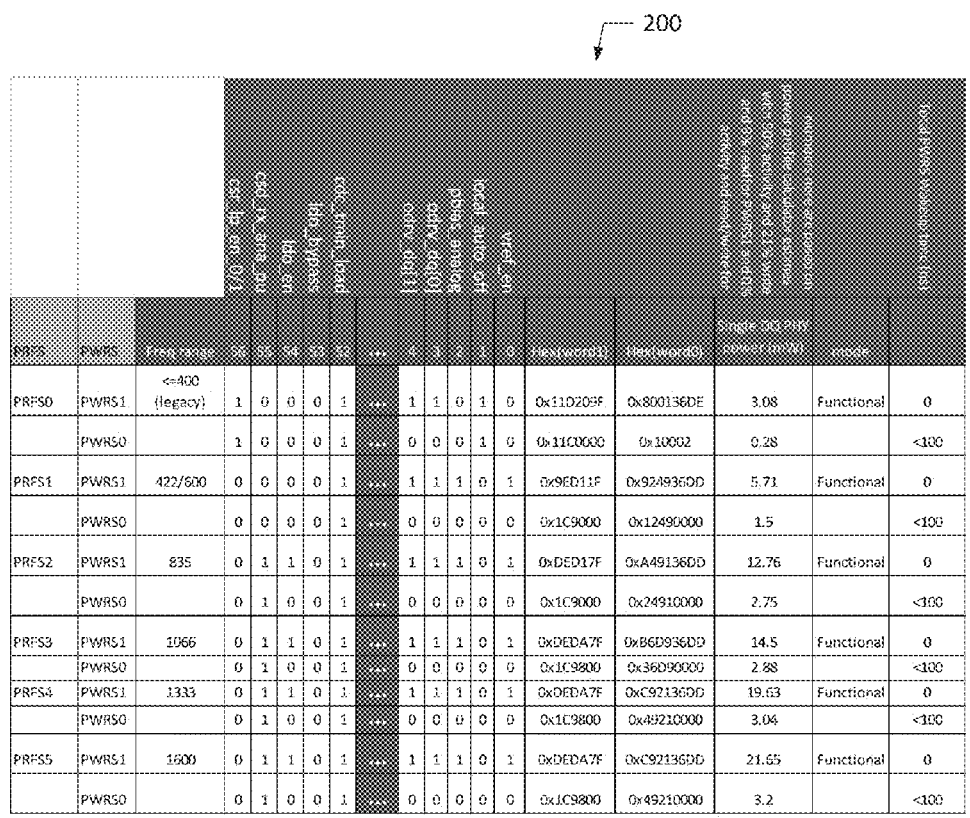
FIG. 3B is an example Performance State (PRFS)/Power State (PWRS) table derived from the list of features of blocks shown in FIG. 3A.

FIG. 3B is an example PRFS/PWRS table 200 derived from the list of features of blocks shown in FIG. 3A. Columns labeled 0-56 (columns 5-51 have been omitted to allow the example table to be shown) in the table shown in FIG. 3B are the features of blocks as indexed in FIG. 3A. In the illustrated embodiment of the PRFS/PWRS table 200 in FIG. 3B, each performance state (PRFS0, PRFS1, PRFS2, PRFS3, PRFS4, or PRFS5) is assigned two distinct power states (PWRS0, PWRS1). In one embodiment, the power state PWRS1 is a fully functional state of the PHY interface where all required features for the particular PRFS are turned on and the traffic can be sent and/or received from the PHY interface. In this state, the power consumption is dictated by the traffic switching rate and will be significantly lower when traffic is idle. Further, the power state PWRS0 is a low power state of the PHY interface that is non-functional (i.e. the traffic cannot be sent through the PHY interface in this state). The power state PWRS0 has a significantly lower power consumption compared to the power state PWRS1, because no traffic is going through the PHY interface and most features of the blocks are turned off to save power. In the power state PWRS0, the blocks with longer wakeup times may be kept enabled so the power state PWRS0 has a relatively low wakeup time requirement.

Each power state may be allocated a dedicated feature enable register (FER). Each FER defines the features that are enabled and/or disabled for a particular performance-power state. Thus, using FERs, software has the flexibility to define performance-power characteristics of the DDR PHY.

Figure 4A:
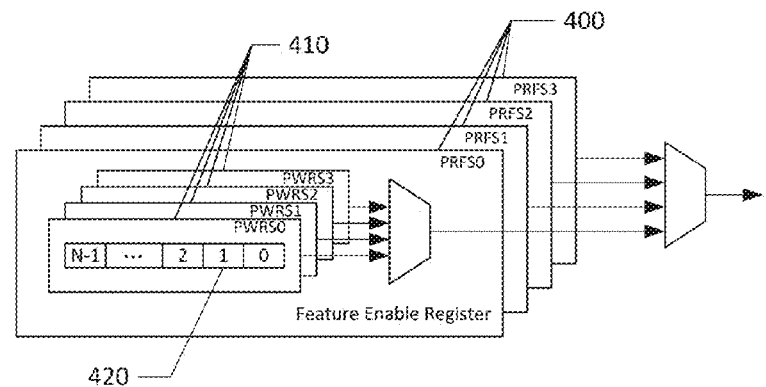
FIG. 4A shows a plurality of performance states, each performance state including a plurality of power states, and each power state having a dedicated feature enable register that defines the status (enable/disable) of the features.
Figure 4B:
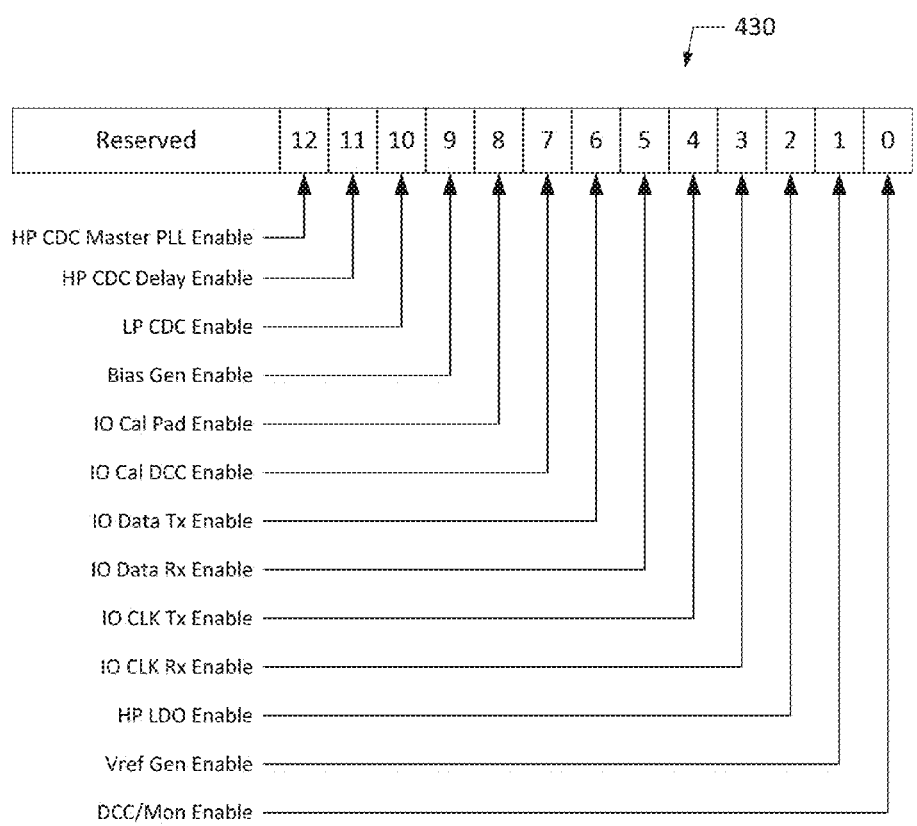
FIG. 4B is an example feature enable register (FER) that defines the status of 13 features.

FIG. 4A shows a plurality of performance states 400, each performance state including a plurality of power states 410, and each power state having a dedicated feature enable register 420 that defines the status (enable/disable) of the features. In the illustrated embodiment of FIG. 4A, the feature enable register 420 uses n bits to define the status of n features. FIG. 4B is an example FER 430 that defines the status of 13 features.

Figure 5:
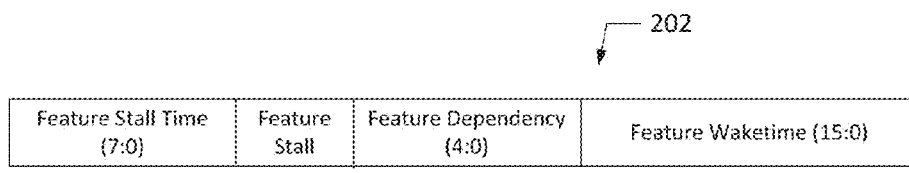
FIG. 5 is an example feature wake time table (FWT) in accordance with one embodiment of the present invention.

FIG. 5 is an example row of a feature wake time table (FWT) 202 in accordance with one embodiment of the present invention. The FWT 202 is a set of registers each defining the wakeup time requirements of features, as well as dependencies between features that need to be honored in terms of sequence of turning on features. The table 202 also includes fields for stall-time requirements of the features and whether feature enablement needs to happen during a traffic stall period. FWT 202 may include one row for each of the features of blocks 120.

Figure 6:
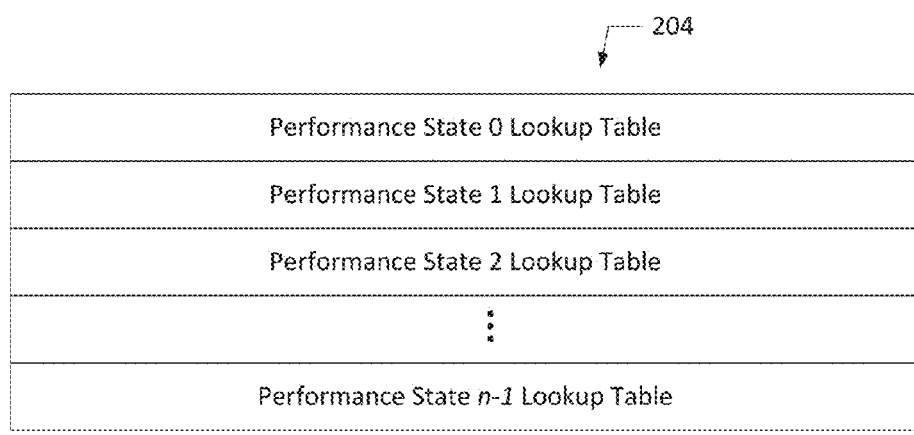
FIG. 6 is an example performance lookup table in accordance with one embodiment of the present invention.

FIG. 6 is an example performance lookup table 204 in accordance with one embodiment of the present invention. The performance lookup table 204 defines the mapping between performance states and frequency ranges. The table 204 also keeps the clock periods corresponding to each of the defined performance states. In the table 204, performance state frequency threshold settings can be set based on supported frequency range of a specific product. In one embodiment, following performance state frequency threshold settings can be defined: (1) PRFS0: This performance state defines the lowest frequency (e.g., <333 MHz) and lowest power device configuration. This performance state assumes that all high performance features are disabled and are placed into a low leakage state; (2) PRFS1: This performance state defines a low frequency (e.g., 400 MHz) and low power device configuration. This performance state assumes that some higher performance features are enabled, but a majority of others are disabled and placed into a low leakage state; (3) PRFS2: This performance state defines a modest frequency (e.g., 533/667 MHz) and modest power device configuration. This performance state assumes that some higher performance features are enabled, while others are disabled and placed into a low leakage state; (4) PRFS3: This performance state defines a higher frequency (e.g., 800 MHz) and power range and assumes that required features are enabled; (5) PRFS4: This performance state defines a higher frequency (e.g., 1066/1333 MHz) and power range and assumes that required features are enabled; and (6) PRFS5: This performance state defines the highest frequency (e.g., 1600 MHz) and highest power device configuration. This performance state assumes that all higher performance features are enabled. Performance states can be mapped to device tiers and are software configurable through time boot configuration.

For each performance state, multiple power states are defined to describe states to which PHY can switch based on DDR PHY interface low power requests. The features of blocks that are enabled and/or disabled for different power states are selected based on the requested wake-up times and the settling times of those features. Thus, in one embodiment, following power states can be defined: (1) PWRS2: This power state is the full functional state of PHY where all required features for the particular PRFS are turned on and traffic can be sent and/or received from PHY. In this state the power consumption is dictated by the traffic switching rate and will be significantly lower when traffic is idle; (2) PWRS1: This power state is a low power state of the PHY that is non-functional, i.e. traffic cannot be sent through PHY in this state. PWRS1 has a significantly lower power consumption compared to PWRS2, because no traffic is going through PHY and most features of blocks are turned off to save power. In PWRS1, blocks with longer wakeup times are kept enabled so PWRS1 has a relatively low wakeup time requirement. The assumption is that PWRS1 will have lower power consumption, compared to PWRS2 idle power consumption, due to disabling additional features; and (3) PWRS0: This power state is the lowest power state of the PHY and is non-functional, i.e. traffic cannot be sent through a PHY in this state. PWRS0 has no dynamic or static power consumption. Leakage power is the primary power consumption in this state. Accordingly, if requested wakeup time is long, all PHY features including clocking features of custom macro such as master calibrated delay cell (CDC) and other blocks that have higher wakeup times can be turned off and turned back on in time to have the PHY fully enabled within the given wakeup time request. This will result in lowest power state of PHY.

Figure 7A:
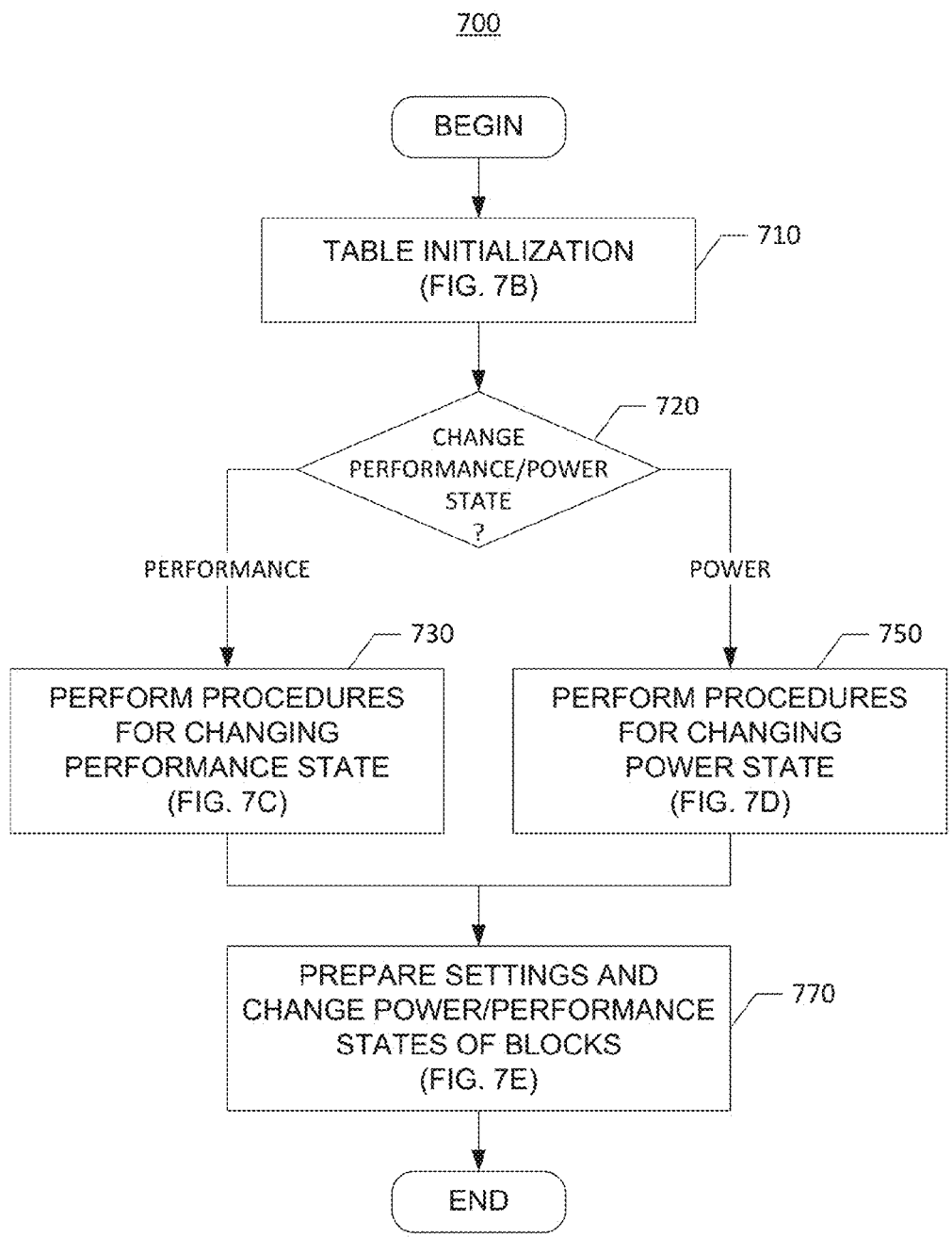
FIG. 7A is a functional flow diagram illustrating a sequencing logic based on a memory controller request for changes to the frequency and/or power state in accordance with one embodiment of the present invention.

FIG. 7A is a functional flow diagram illustrating a sequencing logic 700 based on a memory controller request for changes to the frequency and/or power state in accordance with one embodiment of the present invention. As stated above, the sequencing logic 700 steps through the process of enabling required features and disabling non-required features, while considering the timing and dependencies between the features. In the illustrated embodiment of FIG. 7A, the tables are initialized, at step 710 (see FIG. 7B). In one embodiment, the wake time calculation FSM 210 performs the sequencing logic of initializing the tables. A determination is then made, at step 720, whether a request for changes to the performance and/or power states is received from memory controller 132. If memory controller 132 requests a change to the performance state, at step 720, procedures are performed by the frequency switch FSM 212, at step 730 (see FIG. 7C), to change the performance state. If memory controller 132 requests a change to the power state, at step 720, procedures are performed by the low power switch FSM 214, at step 750 (see FIG. 7D), to change the power state. The settings of the blocks 120 are prepared and the operating states (e.g., performance and/or power states) are changed, at step 770 (see FIG. 7E), by the feature wakeup FSM 218.

Figure 7B:
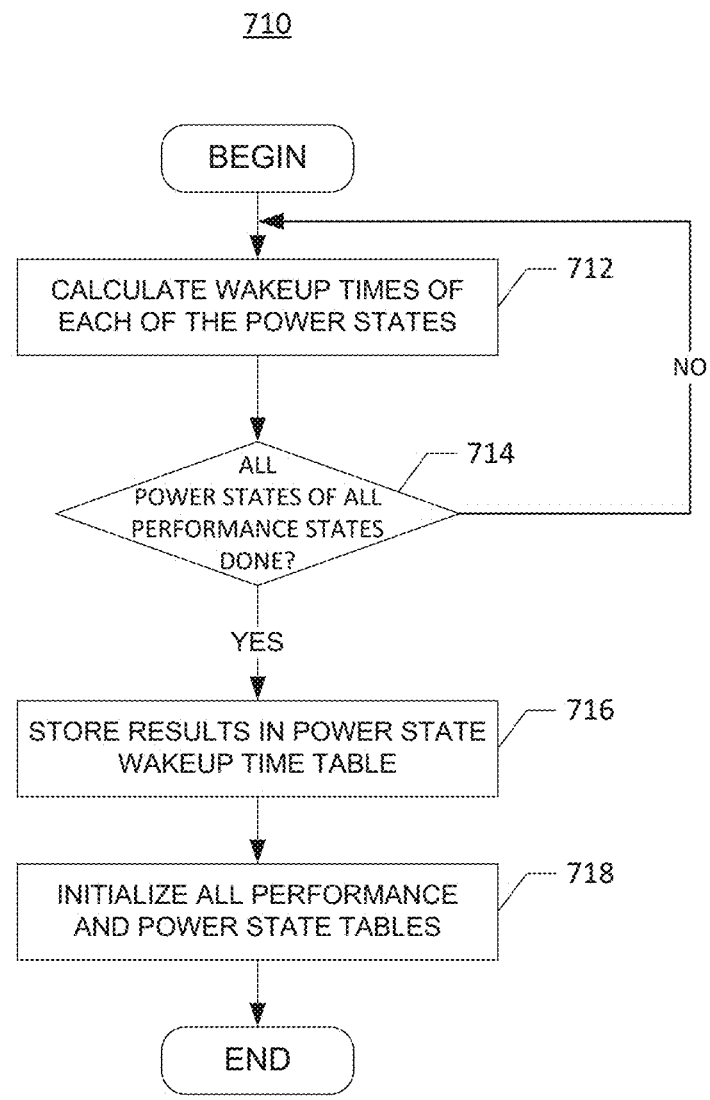
FIG. 7B is a functional flow diagram illustrating a sequencing logic for initializing all performance and power state tables in accordance with one embodiment of the present invention.

FIG. 7B is a functional flow diagram illustrating a sequencing logic 710 for initializing all performance and power state tables in accordance with one embodiment of the present invention. In the illustrated embodiment of FIG. 7B, the wakeup times of each of the power states (i.e. the amount of time it takes to switch the PHY from a non-functional power state to a fully-functional state) is calculated, at step 712. This calculation is performed for each power state of each performance state at boot time. Thus, if it is determined, at step 714, that the wakeup times of all power states of all performance states have been calculated, the results of this calculation are stored in a power state wakeup time table 202, at step 716, and are referred to during low power request transitions. Otherwise, additional wakeup times are calculated, at step 712. Then, at step 718, all performance and power state tables are initialized, at step 718.

Figure 7C:
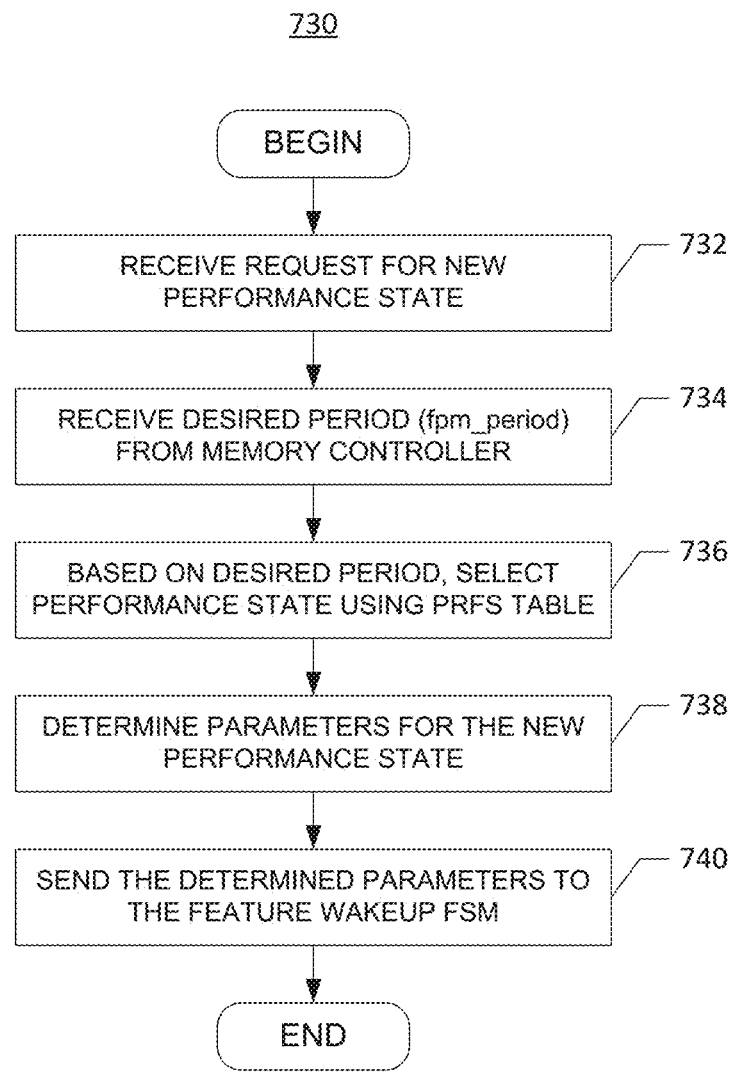
FIG. 7C is a functional flow diagram illustrating a sequencing logic for performing procedures for changing the performance states in accordance with one embodiment of the present invention.

FIG. 7C is a functional flow diagram illustrating a sequencing logic 730 for performing procedures for changing the performance states in accordance with one embodiment of the present invention. In one embodiment, the frequency switch FSM 212 performs this sequencing logic 730, which receives a request for a new performance state from memory controller 132, at step 732. The desired period of the communication rate between SoC 130 and DRAM 140 (e.g., fpm_period in FIG. 2) is also received, at step 734, from the memory controller 132. Based on the desired period received, a performance state is then selected, at step 736, using the performance state tables 204. FSM 212 determines parameters of blocks 120 needed to realize the selected performance state, at step 738, and sends the determined parameters, at step 740, to the feature wakeup FSM 218.

Figure 7D:
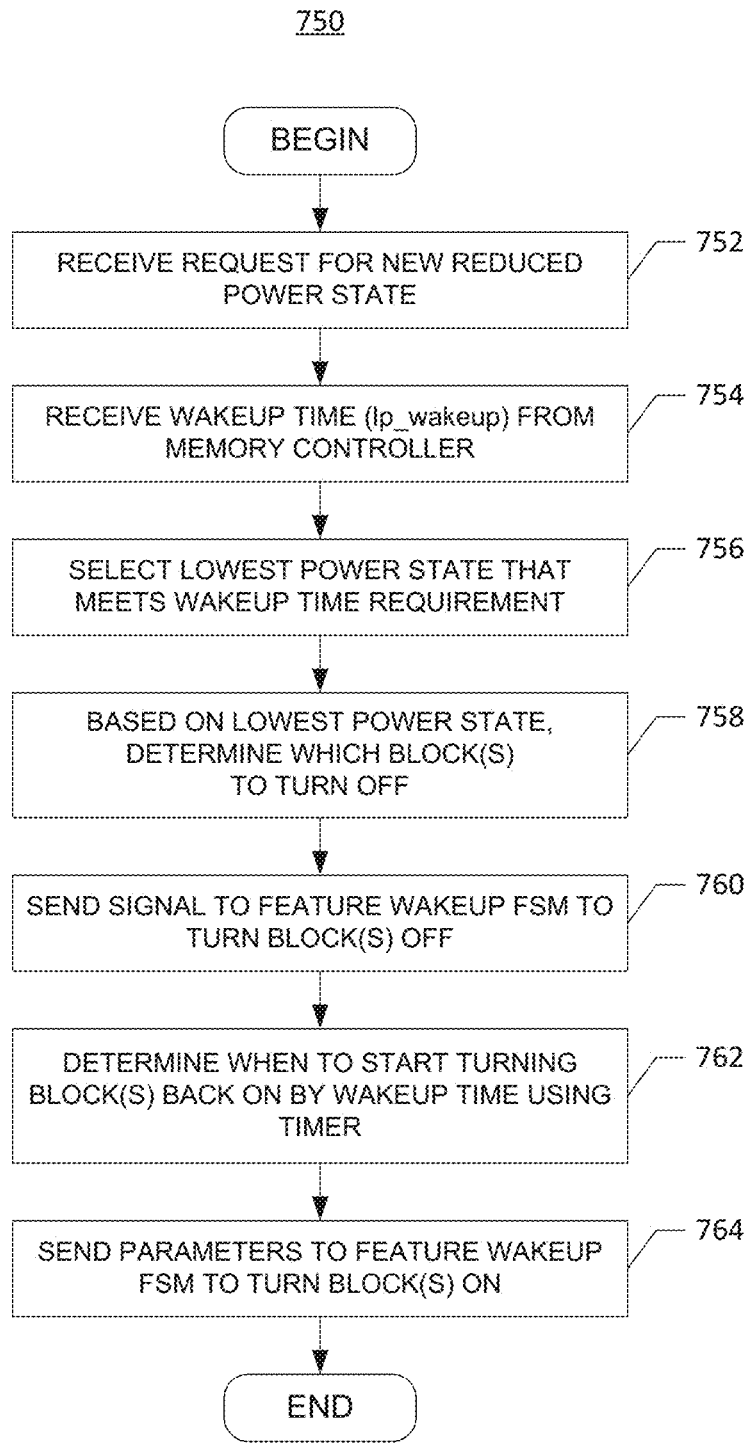
FIG. 7D is a functional flow diagram illustrating a sequencing logic for performing procedures for changing the power states in accordance with one embodiment of the present invention.

FIG. 7D is a functional flow diagram illustrating a sequencing logic 750 for performing procedures for changing the power states in accordance with one embodiment of the present invention. In one embodiment, the low power switch FSM 214 performs this sequencing logic 750, which receives a request for a reduced power state from memory controller 132, at step 752. FSM 214 receives a requested wakeup time (e.g., lp_wakeup in FIG. 2), at step 754, from the memory controller. The low power switch FSM 214 selects one of the plurality of power states that satisfy the requested wakeup time provided by memory controller 132 as the selected lowest power state, at step 756. A determination is made, at step 758, regarding which block(s) to turn off based on the selected lowest power state. A signal is then sent, at step 760, to the feature wakeup FSM 218 to turn the block(s) off. The low power switch FSM 214 also determines when to start turning the block(s) back on by the required wakeup time using the timer 216. In one embodiment, the low power switch FSM 214 sets the timer 216 with a power down time (e.g., pwr_dwn_time in FIG. 2) so that once the power down time has elapsed, the timer 216 issues a power expiration signal (e.g., pwr_dwn_expire in FIG. 2), and the wakeup process initiates in time to bring the PHY interface back to a fully functional state. Parameters for the power state prior to turning the block(s) off are sent, at step 764, to the feature wakeup FSM to turn the block(s) back on.

Figure 7E:
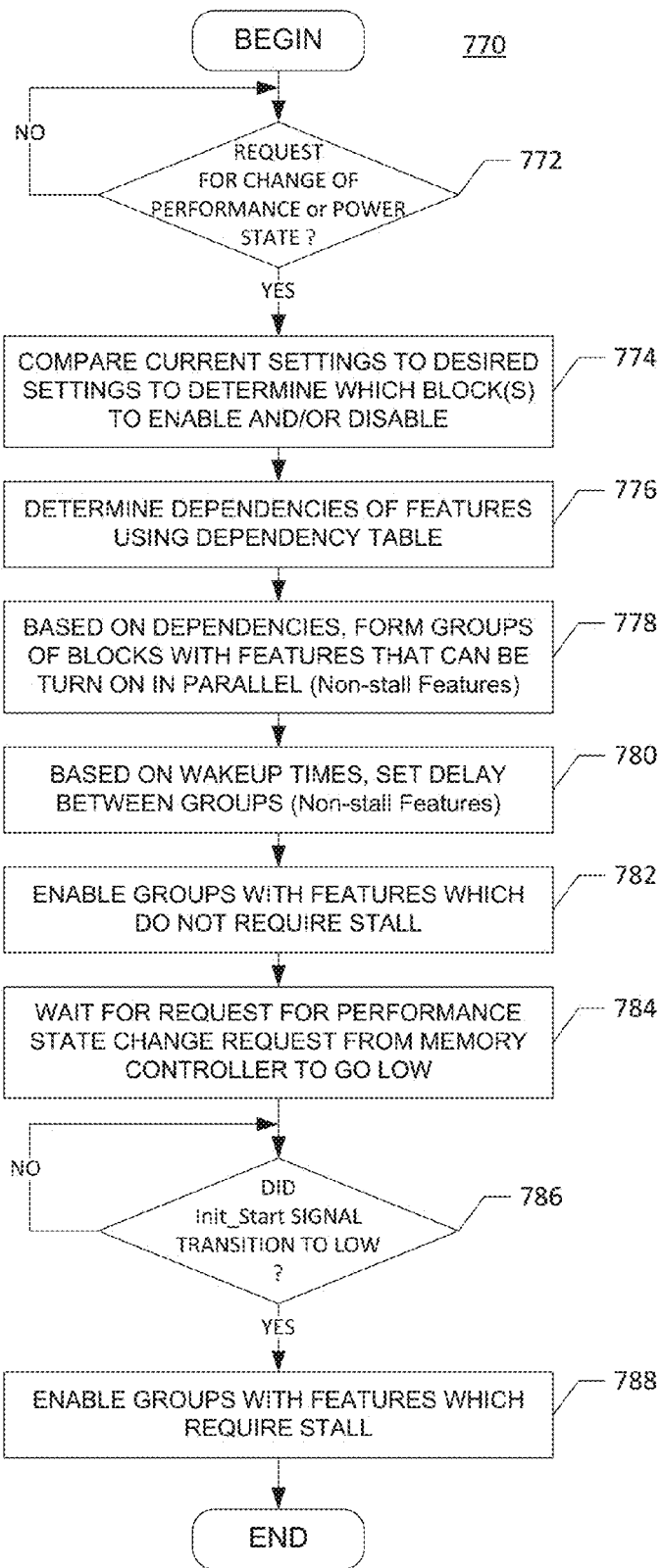
FIG. 7E is a functional flow diagram illustrating a sequencing logic for preparing settings of blocks and changing the operating states in accordance with one embodiment of the present invention.

FIG. 7E is a functional flow diagram illustrating a sequencing logic 770 for preparing settings of blocks and changing the operating states in accordance with one embodiment of the present invention. In one embodiment, the feature wakeup FSM 218 performs this sequencing logic 770. Initially, a request for changes to the performance and/or power states is monitored, at step 772. Thus, if the request is received, at step 772, the current feature settings of the block(s) are compared, at step 774, to the desired feature settings indicated by the parameters sent from the frequency switch FSM 212 or low power switch FSM 214 to determine which feature settings of the block(s) to change. The dependencies of the features are then determined, at step 776, using a dependency table 202. Based on the determined dependencies, groups of blocks with features that can be turn on in parallel are formed, at step 778. The turn-on sequence is performed based on the dependencies between different features and enables features that are not dependent in parallel and then enables next set of features. Further, based on the wakeup times, delays between the groups of blocks are set, at step 780. The wakeup time requirements of features are considered and the timer is properly set based on these requirements. The groups of blocks with features which do not require stall are enabled, at step 782.

The stall requirements of the features that require traffic stall to be turned on are also considered. A set of enable signals that are based on stall time requirements of those features are then generated. These enable signals are triggered, at step 786, once the init_start signal coming from the memory controller goes low indicating a traffic stall period. At step 788, the groups of blocks with features which require stall are enabled. After enabling features, the init_complete signal is sent to the memory controller indicating the end of the frequency switch or low power transition.

Accordingly, embodiments of the frequency and power manager of the present invention are based on architecture that supports frequency and power scaling. Further, the architecture of the frequency and power manager is independent of the feature. The architecture is also independent of DDR PHY implementation with respect to the type of circuit features that are supported. The architecture is feature expandable for higher performance and feature collapsible for lower performance designs. The architecture also supports a table-based structure for keeping information of each of the features (e.g., wakeup time requirement and dependencies on other features) and is software programmable with respect to features, wake times, and dependencies. The architecture further controls timing and sequence of enabling or disabling a large number of analog/IO features and maintaining the sequence and requirements of each of those features.

Although several embodiments of the invention are described above, many variations of the invention are possible. For example, although the illustrated embodiments describe the frequency and power management with respect to a DDR-PHY application, the frequency and power management described in this application can be used in other memory control request applications. Further, features of the various embodiments may be combined in combinations that differ from those described above. Moreover, for clear and brief description, many descriptions of the systems and methods have been simplified. Many descriptions use terminology and structures of specific standards. However, the disclosed systems and methods are more broadly applicable.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method, comprising:
   changing operating states of a PHY interface which includes a plurality of blocks, said changing operating states of a PHY interface comprises:
   receiving parameters indicating desired feature settings of the plurality of blocks for changing the operating state of the PHY interface;
   enabling the desired feature settings in a sequence, the sequence based on dependencies between the feature settings, the dependencies being stored in a dependency table; and
   forming groups of blocks with features that can be turned on in parallel based on the dependencies.

2. The method of claim 1, wherein a feature wakeup finite state machine (FSM) is configured to perform the changing of operating states of a PHY interface.

3. The method of claim 1, wherein the dependency table is implemented in a set of registers and entries of the dependency table are software programmable.

4. The method of claim 1, further comprising
   setting delays between the groups of blocks based on wakeup times of blocks of each group.

5. The method of claim 1, further comprising
   comparing current feature settings to the desired feature settings of the plurality of blocks to determine which feature settings of at least one block from the plurality of blocks to change.

6. The method of claim 1, wherein the operating states of the PHY interface comprises performance states and power states.

7. The method of claim 1, further comprising:
   receiving a desired period from a memory controller; and
   selecting a performance state based on the desired period received and using performance state tables.

8. The method of claim 1, further comprising:
   receiving a requested wakeup time from a memory controller; and
   selecting a lowest power state that meets requirements of the wakeup times.

9. The method of claim 2, wherein the feature wakeup FSM is configured in hardware.

10. The method of claim 5, further comprising:
    enabling the desired feature settings for the at least one block which do not require traffic stall; and
    waiting for the traffic stall and enabling the feature settings of the at least one block that needs to occur after the traffic stall.

11. The method of claim 6, further comprising calculating wakeup times of each of the power states and storing the wakeup times in a wakeup time lookup table.

12. The method of claim 6, further comprising performing procedures for changing the performance states of the PHY interface.

13. The method of claim 6, further comprising performing procedures for changing the power states of the PHY interface.

14. The method of claim 13, wherein a low power switch FSM is configured to perform the procedures for changing the power states of the PHY interface.

15. The method of claim 7, further comprising
    determining and sending the parameters indicating desired feature setting for the selected performance state.

16. The method of claim 12, wherein a frequency switch FSM is configured to perform the procedures for changing the performance state of the PHY interface.

17. The method of claim 8, further comprising:
    determining the desired feature settings based on the selected lowest power state; and
    sending the desired feature settings to a feature wakeup FSM to turn off the at least one block.

18. The method of claim 17, further comprising:
determining the desired feature settings of when to turn the at least one block back on based on the wakeup times; and
sending the desired feature settings to the feature wakeup FSM to turn off the at least one block.

19. A state machine apparatus for changing an operating state of a PHY interface, the state machine apparatus configured to:
receive parameters indicating feature settings of a plurality of blocks for changing the operating state of the PHY interface;
enable the feature setting in a sequence, the sequence based on dependencies between the feature settings, the dependencies being stored in a dependency table;
the state machine apparatus comprising
a feature wakeup unit configured to form groups of blocks with features that can be turned on in parallel based on the dependencies, and to set delays between the groups of blocks based on wakeup times of blocks of each group.

20. An apparatus for changing an operating state of a PHY interface, the apparatus comprising:
means for receiving parameters indicating desired feature settings of a plurality of blocks for changing the operating state of the PHY interface;
means for enabling the desired feature settings in a sequence, the sequence based on dependencies between the feature settings, the dependencies being stored in a dependency table;
means for comparing current feature settings to the desired feature settings of the plurality of blocks to determine which feature settings of at least one block from the plurality of blocks to change.

21. The apparatus of claim 20, further comprising:
means for enabling the feature settings for the at least one block which do not require traffic stall; and
means for waiting for the traffic stall and enabling the feature settings of the at least one block that needs to occur after the traffic stall.

22. A frequency and power managing system, comprising:
a plurality of tables having a representation of features and properties of a plurality of blocks including frequency threshold, wakeup time requirements, interdependencies, and power requirements; and
a sequencing unit configured to switch feature settings of the plurality of blocks to an operating state of a plurality of operating states of a PHY interface, including performance states and power states, based on a request from a memory controller.

23. The system of claim 22, wherein the sequencing unit is hardware configured in a state machine to step through a process of enabling the feature settings used in the performance states or power states and disabling the feature settings not used in the performance states or power states.

24. The system of claim 22, wherein the sequencing unit includes a feature wakeup unit configured to form groups of blocks with feature settings that can be turned on in parallel based on the interdependencies, and to set delays between the groups of blocks based on wakeup time requirements of blocks of each group.

25. The system of claim 22, wherein the sequencing unit includes
a wake time calculation unit configured to calculate wakeup times of each of the power states and storing the wakeup times in a wakeup time lookup table.

26. The system of claim 22, wherein the sequencing unit includes
a frequency switch unit configured to perform procedures for changing the performance states of the PHY interface.

27. The system of claim 22, wherein the sequencing unit includes
a low power switch unit configured to perform procedures for changing the power states of the PHY interface.

* * * * *